(12) United States Patent
Chien et al.

(10) Patent No.: US 11,434,426 B2
(45) Date of Patent: Sep. 6, 2022

(54) FAST FLEXOELECTRO-OPTIC SWITCHING BASED ON BIMESOGEN-DOPED AND POLYMER-STABILIZED VERTICAL STANDING HELIX MODE

(71) Applicant: KENT STATE UNIVERSITY, Kent, OH (US)

(72) Inventors: Liang-Chy Chien, Hudson, OH (US); Vinay Joshi, Kent, OH (US); Kai-Han Chang, Kent, OH (US)

(73) Assignee: Kent State University, Kent, OH (US)

( * ) Notice: Subject to any disclaimer, the term of this patent is extended or adjusted under 35 U.S.C. 154(b) by 447 days.

(21) Appl. No.: 16/493,919

(22) PCT Filed: Mar. 9, 2018

(86) PCT No.: PCT/US2018/021735
§ 371 (c)(1),
(2) Date: Sep. 13, 2019

(87) PCT Pub. No.: WO2018/169783
PCT Pub. Date: Sep. 20, 2018

(65) Prior Publication Data
US 2020/0385634 A1    Dec. 10, 2020

Related U.S. Application Data

(60) Provisional application No. 62/470,464, filed on Mar. 13, 2017.

(51) Int. Cl.
*C09K 19/02* (2006.01)
*C09K 19/04* (2006.01)
*C09K 19/58* (2006.01)
*G02F 1/137* (2006.01)
*C09K 19/54* (2006.01)

(52) U.S. Cl.
CPC .......... *C09K 19/0258* (2013.01); *C09K 19/04* (2013.01); *C09K 19/58* (2013.01); *G02F 1/13718* (2013.01); *C09K 2019/0444* (2013.01); *C09K 2019/548* (2013.01); *G02F 1/13775* (2021.01)

(58) Field of Classification Search
CPC ....................................... C09K 19/36
See application file for complete search history.

(56) References Cited

U.S. PATENT DOCUMENTS

| 2013/0056680 A1* | 3/2013 | Lee ................... C09K 19/2028 252/299.63 |
| 2015/0090935 A1 | 4/2015 | Adlem et al. |
| 2015/0175886 A1 | 6/2015 | Tuffin et al. |
| 2016/0033806 A1* | 2/2016 | Lavrentovich ....... C09K 19/586 349/33 |
| 2016/0170118 A1* | 6/2016 | Chien ................. G02F 1/13718 349/193 |

* cited by examiner

*Primary Examiner* — Chanceity N Robinson
(74) *Attorney, Agent, or Firm* — Hudak, Shunk & Farine Co. LPA

(57) ABSTRACT

A fast flexoelectro-optic switching device containing bimesogen-doped and polymer-stabilized vertical standing helix (PSVSH) in a cholesteric liquid crystal. The PSVSH device exhibits a response time of less than 0.7 millisecond, high contrast and negligible hysteresis which is suitable for applications including blur-free displays, field-sequential color displays and active optical elements.

19 Claims, 6 Drawing Sheets

FAST FLEXOELECTRO-OPTIC SWITCHING BASED ON BIMESOGEN-DOPED AND POLYMER-STABILIZED VERTICAL STANDING HELIX MODE

FIELD OF THE INVENTION

The invention relates to a fast flexoelectro-optic effect in bimesogen-doped polymer stabilized cholesteric liquid crystal in a Polymer-Stabilized Vertical Standing Helix (PSVSH) mode with high transmittance, low hysteresis and negligible color shift. The PSVSH device shows a sub-millisecond response time less than 0.7 ms and frequency-independent flexoelectric time response. The fast-switching PSVSH device is a promising candidate for active retarders, blur-free displays, field-sequential color displays, fast-switching electro-optic and other photonic devices.

BACKGROUND OF THE INVENTION

Novel mechanisms for electric or magnetic field-induced reorientation of liquid crystals (LCs) have led to proliferation of applications for LCs in display technology requiring ultra-fast response time to eliminate motion blur and color shift. A linear flexoelectro-optic effect was observed in short-pitch cholesteric liquid crystals (CLCs) that originates from the coupling between applied electric field and splay-bend deformations which induces an effective polarization due to rotation of helical axis with short response time. Fast switching flexoelectro-optic response opens new pathways for application of liquid crystal devices as active retarders in 3D displays and field sequential color displays.

SUMMARY OF THE INVENTION

Although blue-phase devices and cholesteric liquid crystals (CLC) in uniform lying helix (ULH) mode show a fast switching mechanism, the process of device manufacturing is quite complicated with unavoidable problems like high viscosity in manufacturing with a one drop fill process and surface-induced defects in ULH mode which lowers the contrast ratio.

An alternative method to study fast switching mechanism in CLCs is set forth herein with respect to vertical standing helix (VSH) mode where the conventional low energy Grandjean texture is formed with helical axis normal to the surface.

In VSH mode, rotation of optic axis of CLC molecules is generated by applying the electric field normal to helical axis using an in-plane interdigitated electrode pattern as shown in the schematic in FIG. 1. One of the important benefit of VSH mode is the excellent dark state which can be achieved with short helical pitch of CLCs so that reflectance band gap does not lie in visible wavelength range and thus potentially obtaining high contrast ratio. However, to maximize the flexoelectro-optic response, it is necessary to have liquid crystal materials with large splay ($e_s$) and bend ($e_b$) flexoelectric coefficients along with low dielectric anisotropy ($\Delta\varepsilon$) to avoid the dielectric coupling. Bimesogen LCs having two rod-like mesogens separated by flexible alkyl chain with odd number of carbon atoms, have a large flexoelectric coefficients, as reported previously. In this work, we demonstrate fast flexoelectro-optic effect in VSH device for bimesogen-doped polymer stabilized CLCs having low hysteresis, low color chromaticity and sub-millisecond response time.

DETAILED DESCRIPTION OF THE INVENTION

Materials and Methods

Figure 1:
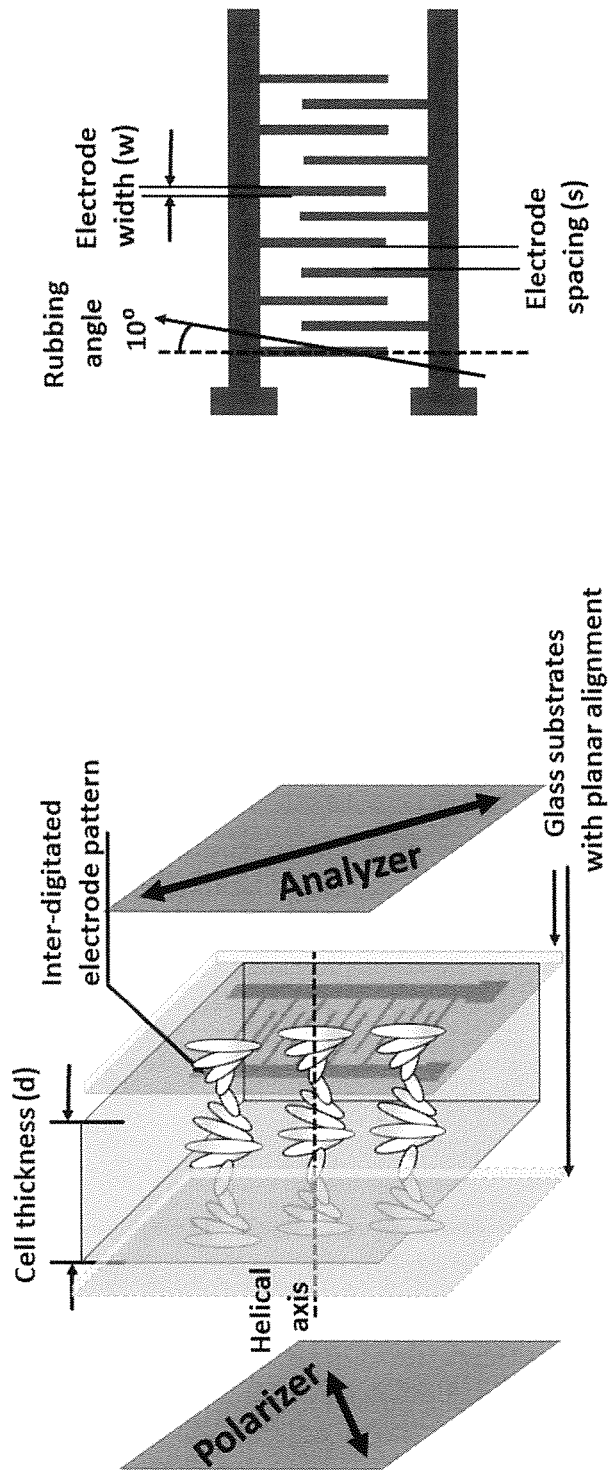
FIG. 1: Schematic of electro-optic test cells with interdigitated electrode pattern having electrode width (w) and electrode spacing (s) and cell thickness (d). For electro-optic measurements, the planar test cells are oriented between crossed linear polarizer and analyzer. The inset picture shows of alignment of cholesteric liquid crystal molecule with helical axis normal to the surface.

The flexoelectro-optic response in CLCs was made with a test cell having interdigitated in-plane electrodes with planar alignment rubbed at 10° to the electrodes as shown in FIG. 1. The overall configuration of test cell is represented in terms of electrode width (w), electrode spacing (s) and cell thickness (d) as 'w×s×d'. Shorter s results are more preferred as it generates stronger electric field which provides a large phase retardation during electro-optic response. The electro-optic test cells of the present invention generally had an electrode width (w) of from about 1 to about 10 µm, desirably from about 2 to about 7.5 µm, and preferably from about 3 to about 5 µm. The electro-spacing (s) can range from about 1 to about 10 µm, desirably from about 2 to about 7.5 µm, and preferably from about 3 to about 6 µm. The cell thickness (d) was from about 2 to about 15 µm, desirably from about 3 to about 10 µm, and preferably from about 5 to about 9 µm.

The cholesteric liquid crystal cells of the present invention comprise one or more calamitic nematic hosts (rod-like), and one or more bimesogens (bent shape nematic liquid crystal). Another compound that forms a cholesteric liquid crystal is one or more chiral dopants wherein the amount thereof is based upon the combined amounts of the nematic host(s) and bimesogen(s), in accordance to the desired helical pitch of cholesteric liquid crystal equation:

$$C = \frac{1}{HTP * p},$$

where c is the concentration of the chiral dopant(s), HTP is the helical twisting power of the chiral dopant(s) and p is the desired helical pitch. The bimesogen doped and polymer-stabilized vertical standing helix liquid crystals compositions of the present invention also contain a reactive mesogen blended or mixed with a UV light photoinitiator. The mesogen is polymerized by the exposing the cholesteric liquid crystal mixture sandwiched between 2 conductive transparent materials such as indium-tin-oxide-coated glass substrates to UV light. While preferably initiation takes place at room temperature, it can range from anywhere from about −30° C. to about +110° C. and desirably from about −20° C. to about +100° C. The mixing or blending of all of the various components of the present invention and also preferably be carried out at room temperature, or at any temperature from about 40 to about +100° C.

The bimesogen-doped and polymer stabilized cholesteric liquid mixtures were prepared using a nematic host with low dielectric anisotropy (Δε<4.5), that was generally from about −3 to +3, desirably from about −2 to +2, and preferably from about −1 to +1, and high twisting power chiral dopant to achieve a helical pitch of the cholesteric liquid crystal composition between about 100 nm to about 300 nm, desirably from about 120 to about 250 nm, and preferably from about 120 to about 200 nm. A helical pitch less than 150 nm is preferred.

The one or more nematic hosts (rod-like) and any combination thereof utilized in the present invention aid in forming the fast flexoelectro-optic switching bimesogen-doped and polymer-stabilized verticle standing helix mode compositions of the present invention. Such nematic hosts are known to the art and to the literature and include calamitic nematic liquid crystals. Suitable specific hosts of the present invention include 4'-Pentyl-4-biphenylcarbonitrile (5CB) made by Merck. Other hosts include E7 (a mixture of several cyanobiphenyl compounds with long aliphatic tails), that is made by Merck, BL006—a high birefringence liquid crystal mixture made by Merck, and also HTG135200—a high dielectric liquid crystal mixture made by HCCH. The amount of the one or more nematic hosts that can be utilized ranges to form the cholesteric liquid crystal of the present invention from about 30 to about 90, desirably from about 30 to about 70, and preferably from about 40 to about 60 parts by weight. As these compounds are mixtures of different nematic liquid crystals, there is no single chemical structure for these. The chemical structures of these liquid crystals cannot be found in any literature available in public domain.

As noted above, an important component of the cholesteric liquid crystal is the utilization of a bimesogen (bent shape) that is mixed with the noted nematic host(s). Examples of such bimesogens include CB5CB, CB6OCB, CB7CB, CB9CB, and CB11CB. These compounds are made by Merck and have the following formulations.

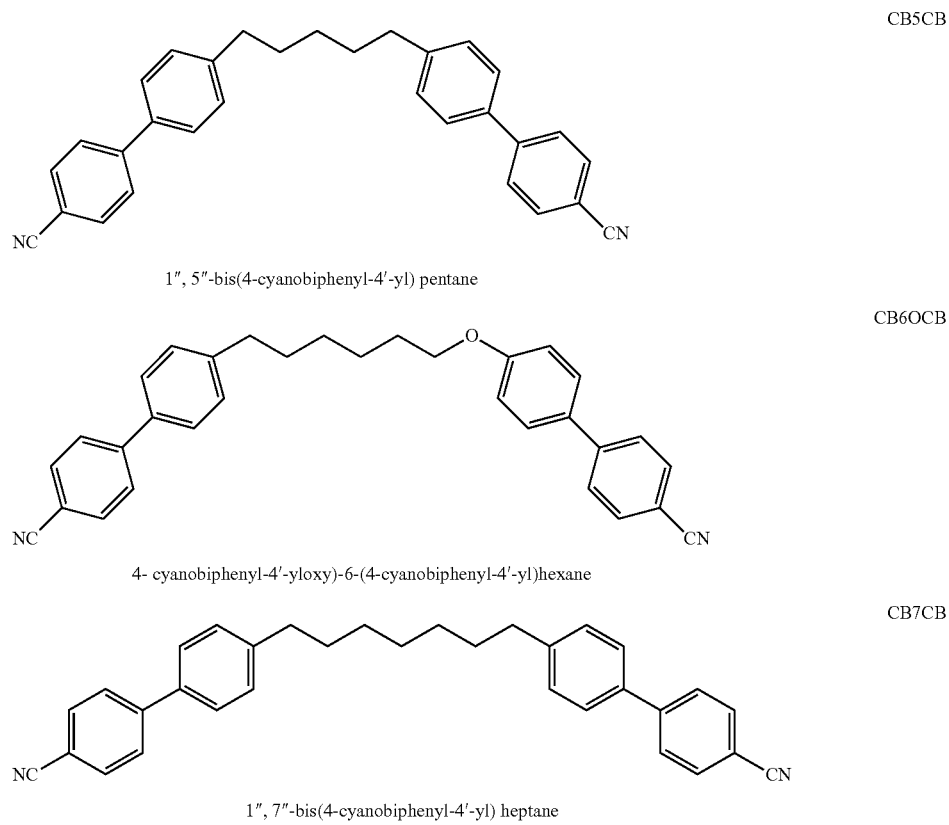

CB5CB

1″,5″-bis(4-cyanobiphenyl-4′-yl) pentane

CB6OCB 4-cyanobiphenyl-4′-yloxy)-6-(4-cyanobiphenyl-4′-yl)hexane

CB7CB

1″,7″-bis(4-cyanobiphenyl-4′-yl) heptane

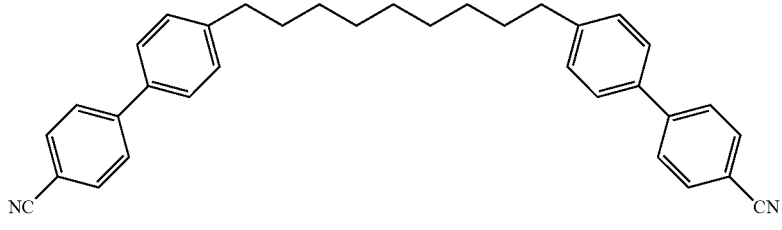

CB9CB 1,9-di-(1″-cyanobiphenyl-4-yl)nonane

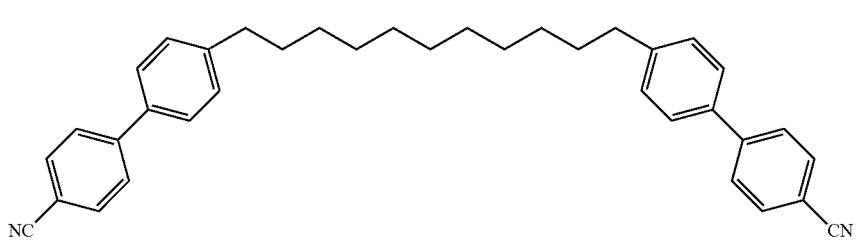

CB11CB 1,11-di-(1″-cyanobiphenyl-4-yl)undecane

The amount of the reactive bimesogen is generally from about 10 to about 70, desirably from about 30 to about 70, and preferably from about 40 to about 60 parts by weight. The one or more nematic hosts and one or more bimesogens form part of the cholesteric liquid crystal composition of the present invention.

Higher concentrations of the one or more bimesogen can be added to the additive mixture to enhance the flexoelectric response but the mixture undergoes phase separates at room temperature and thus generally requires higher temperatures depending upon the concentration of CB7CB and/or above noted bimesogens. Also, the different bimesogen have different miscibility with the nematic host and hence doping concentration of each bimesogen to achieve miscible mixture is different. Suitable mixing temperatures with respect to the bimesogen compounds as well as the nematic host, doping compounds, and the like is generally from about −30° C. to about 110° C. and desirably from about −20° C. to about 100° C., and preferably about room temperature, that is from about 15° C. to about 30° C.

A third component of the present invention that forms the generic cholesteric liquid crystal blend of the present invention is generally one or more, or any combination of the following chiral dopants: R or S5011, R or S811, CB15, R or S1011 and/or R or S2011, all made by Merck Chemical Inc. These compounds have the following formulations:

R5011

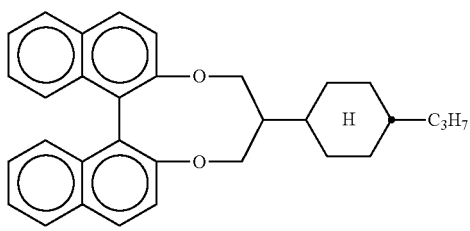

R811

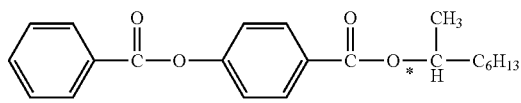

CB15

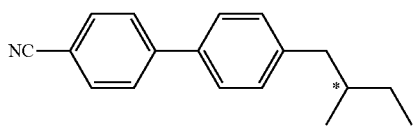

R1011

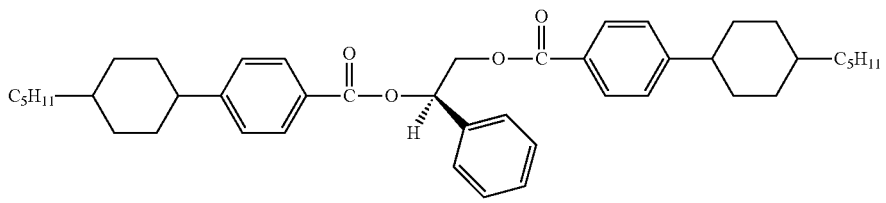

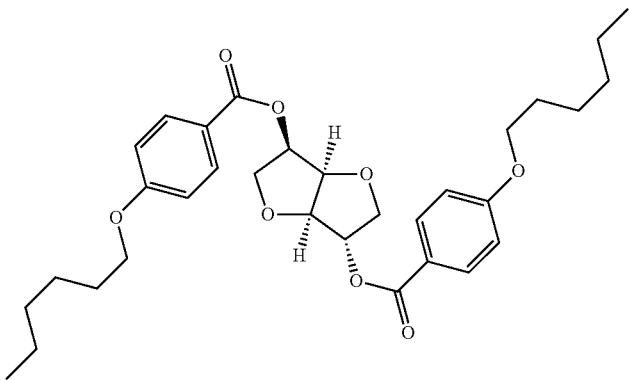

R2011

Suitable amounts of chiral dopants range from about 0.1 to about 6 or 8 or 10, desirably from about 2 to about 5.5, and preferably from about 3 to about 5 parts by weight. These amounts are based upon the combined amounts of the above-noted nematic host and bimesogen liquid crystal compounds that can be utilized. Generally, the total amount of the nematic hosts and bimesogen compounds utilized in various amounts noted above range from about 40 to about 97 parts by weight. Thus, the amount of dopants can be based upon said noted about 40 to about 97 parts by weight. However, another format is the utilization of the noted chiral dopant amounts based upon 100 total parts by weight of the nematic host (rod-like) and the bimesogen (bent shape) nematic liquid crystals, e.g. 80/20, 70/30, 60/40, etc.

An important aspect of the present invention is to utilize one or more reactive mesogens known to the literature and to the art that act as polymer stabilizers that eliminate defects during switching as well as lower the hysteresis of the composition. Suitable mesogens include RM 1, RM 82, RM257, RM60, RM84, and RM249.

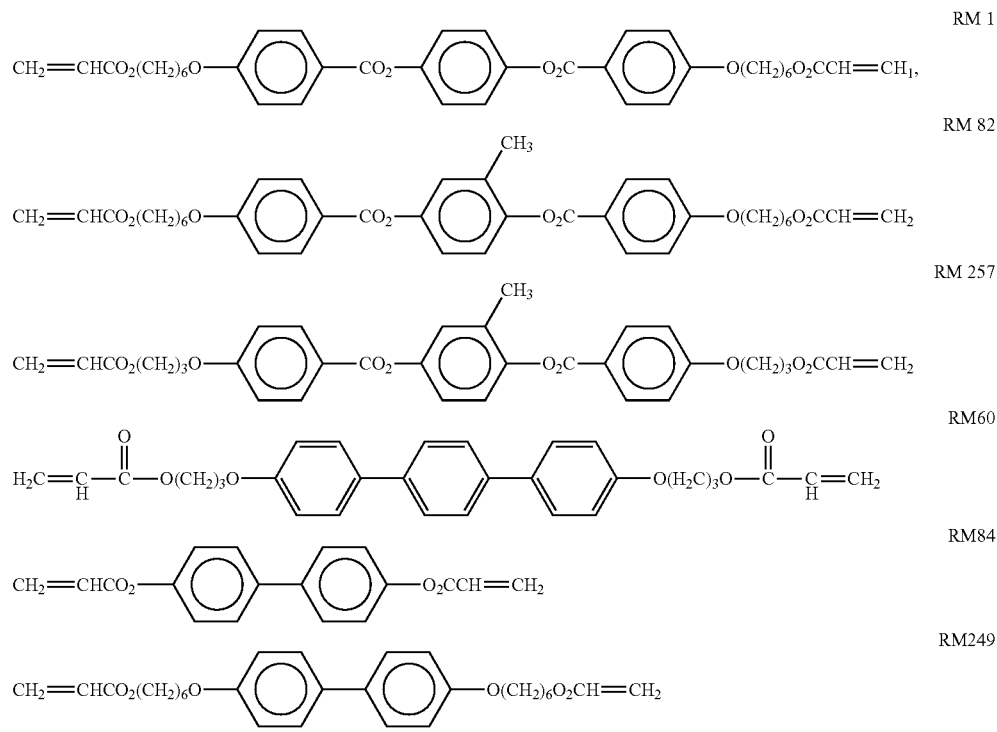

A preferred mesogen is RM257 made by Merck. The amount of the one or more reactive mesogens is generally from about 1 to about 20, or 25, or 30, desirably from about 3 to about 15, and preferably from about 4 to about 10 or 12 parts by weight based upon about 77 to about 98.99 parts by weight of the cholesteric liquid crystal composition or mixture, that is the one or more nematic hosts, the one or more bimesogens, or the one or more dopants. Another format is the utilization of the noted mesogen amounts based upon 100 parts by weight of the nematic host (rod-like) and the bimesogen (bent shape) nematic liquid crystals. It is noted that high concentrations of reactive mesogen lowers the hysteresis and response time but increases the electric field required to generate strong flexoelectro-optic response.

UV photoinitiators are utilized to react the mesogen compounds. The amount thereof is generally from about 0.01 to about 3 or 6, desirably from about 0.1 to about 1, and preferably from about 0.2 to about 0.8 parts by weight per 100 parts by weight of the total weight of the above noted two nematic compounds, that is the one or more nematic hosts, and the one or more bimesogens (bent shape) nematic. Generally, any type of ultraviolet photoinitiator is suitable as known to the literature and to the art. Desired examples include the various Irgacure® compounds produced such as Irgacure 184, 369, 651, and 819, all supplied by Ciba. These compounds have the following formulations:

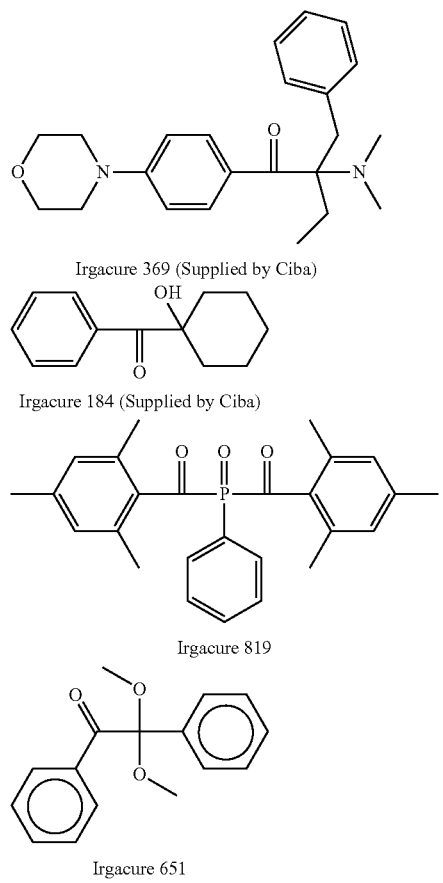

Irgacure 369 (Supplied by Ciba)

Irgacure 184 (Supplied by Ciba)

Irgacure 819

Irgacure 651

As noted above, various defects during switching as well as to lower the hysteresis, reactive mesogen polymer such as Merck RM257 are utilized such as about 8.5 wt. % as well as 0.5 wt. % of the photoinitiator such as Irgacure 651 based upon the total weight of the one or more cholesteric liquid crystals. The ultraviolet light such as obtained from UVATA UP312 can have a wavelength can range from about 250 to about 400, desirably from about 300 to about 380, and preferably from about 350 to about 370 nanometers (nm). The exposure intensity for reacting the mesogen compounds is from about 0.1 mW/cm$^2$ to about 50 mW/cm$^2$ with about 2 to about 10, that is about 5 mW/cm$^2$ being preferred. The cure time can range from about 2 to about 60 minutes, desirable from about 5 to about 30 minutes, and preferably from about 10 to about 20 minutes at room temperature.

Hysteresis

A favorable aspect of the present invention is that the various liquid crystal cells have a low hysteresis value of about 10% or less and preferably about 1% or less. A low hysteresis value is important for display applications if the device is to be switched from gray-to-gray scale. There can be color breakup if the hysteresis is high. This is one of the advantage of the polymer stabilized VSH device of the present invention.

Another favorable aspect of the present invention is that the liquid crystal cells made from the above liquid crystal combination have extremely fast response times such as less than about 1.0 milliseconds, and preferably less than 0.7 milliseconds. They also have high contrast.

The above characteristics of the VSH device of the present invention were generally set forth with regard to favorable amounts of the various components. Moreover, the test conditions were generally all carried out at room temperature.

The present invention will be better understood by reference to the following examples which serve to illustrate but not to limit the scope of the present invention.

Example 1

Figure 2:
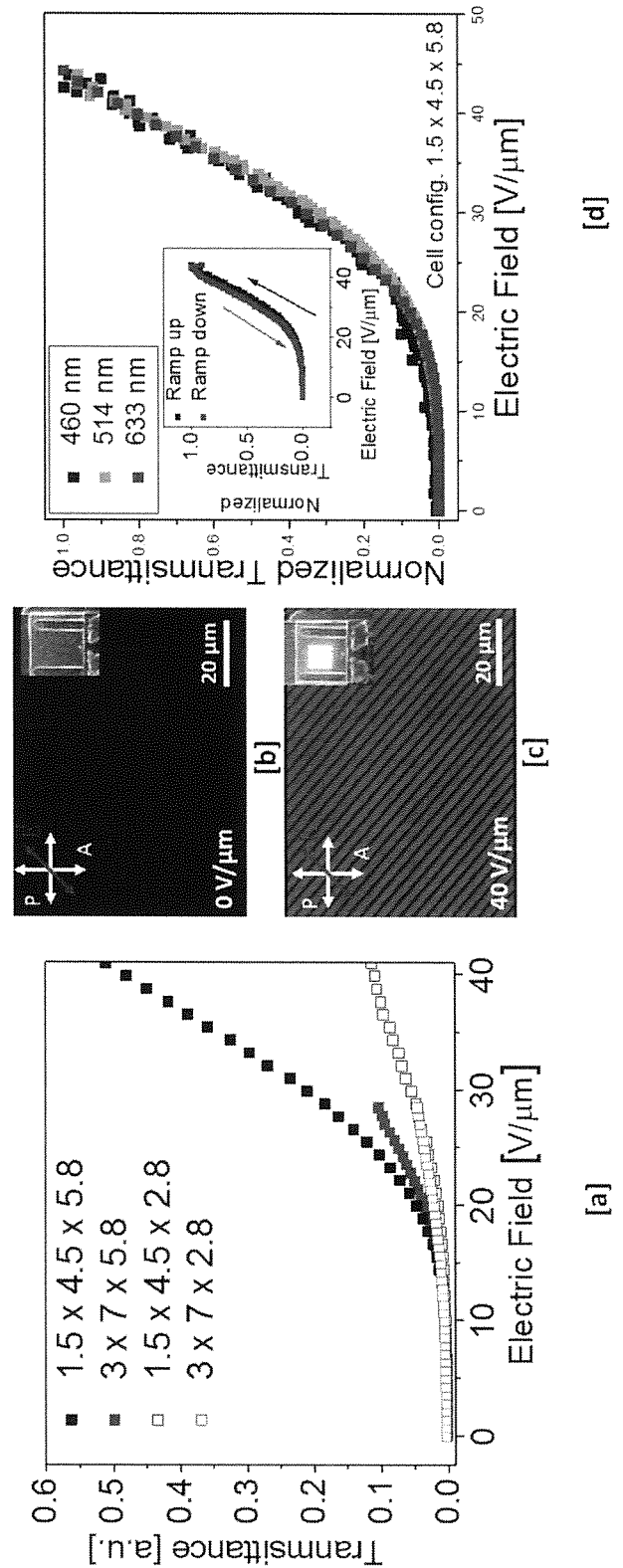
FIG. 2: [a] Transmittance as a function of electric field for test cells with 4 different cell configurations measured with probing He—Ne laser ($\lambda$=633 nm) between crossed linear polarizer and analyzer and applied electric field at 45° to the polarizer. Polarized optical microscopy images of the test cell with configuration 1.5×4.5×5.8 at 0 V/µm [b] and 40 V/µm [c]. Inset shows the pictures of test cells taken on light box. [d] Transmittance measured at 460 nm, 514 nm and 633 nm as a function of electric field. The inset shows effect of ramping reversal on measured transmittance.

In order to evaluate the electro-optical properties of the polymer-stabilized vertical standing helix (PSVSH mode), LC cells with different electrode configurations were fabricated and the following experimental evaluations were performed. FIG. 2 shows the transmittance as function of electric field for four different cell configurations which includes two test cells with w=1.5±0.1 μm, s=4.5±0.1 μm and d=2.8±0.2 μm, 5.8±0.2 μm, while other twos test cells have w=3±0.2 μm, s=7±0.3 μm with same d. For probing the electro-optic effect, He—Ne laser (λ=633 nm) and a photodetector was used. The test cell was placed between crossed linear polarizer and analyzer with electric field aligned at 45° to the polarizer. In all cases, AC field with square wave (1 kHz) was used for measurements. Higher transmittance is observed in test cell '1.5×4.5×5.8' with stronger electric field and higher cell thickness and validated by simulation (TechWiz 2D) which realizes higher phase retardation ($\Gamma \alpha \Delta n \cdot d/\lambda$). Polarized optical microscopy (POM) images show excellent dark state in field-off condition with similar dark texture was retained on removal of applied voltage without any defects. The contrast ratio calculated from transmittance-electric field curve is 300:1. The images of test cell in field-off and field-on conditions shows no crystallization of bimesogen at room temperature even after switching over for more than 100 times. Transmittances measured at 460 nm, 514 nm and 633 nm show the negligible chromatic effect on transmittance of VSH device which is one of the important quality of high performance LCD with minimized color shift. One of important attributes of VSH device is low hysteresis (<5%) which is demonstrated by measured the transmittance by ramping the electric field both ways as depicted in the inset (FIG. 2d).

Example 2

Figure 3:
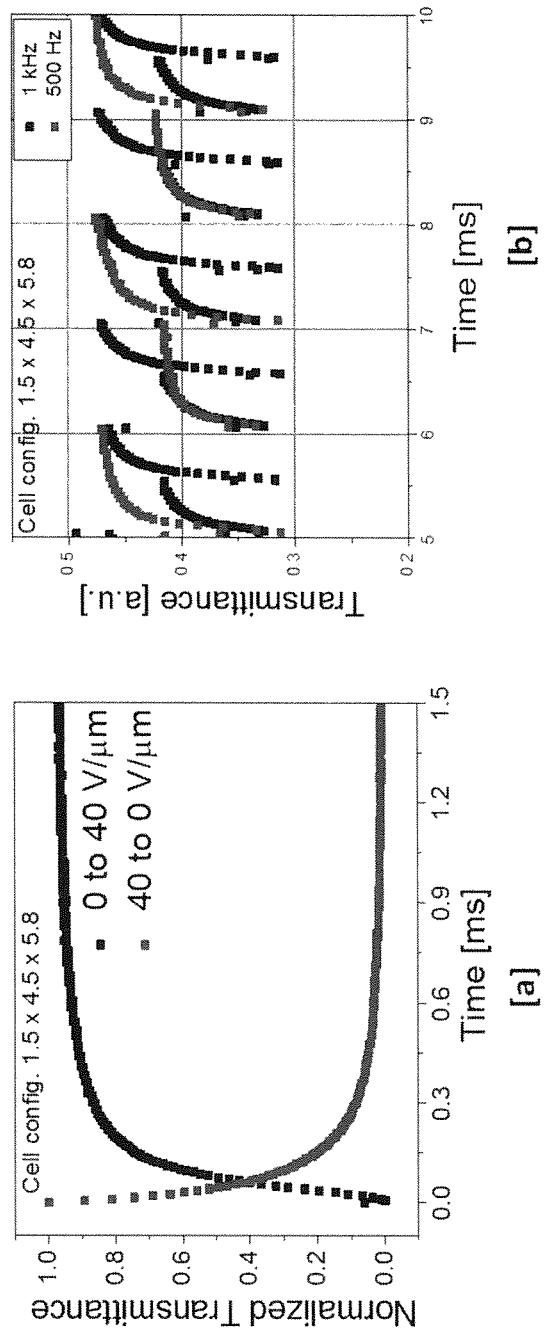
FIG. 3: [a] Transmittance as a function of time during turn-on and turn-off switching process of VSH device with cell configuration 1.5×4.5×5.8 measured with square wave (60 Hz). [b] Transmittance as a function of time measured from 0 to 40 V/µm square wave AC field at 1 kHz and 500 Hz.

The driving electric field of VSH device is approximately 40 V/μm. The time response of VSH device in turn-on (0 to 40 V/μm) and turn-off (40 to 0 V/μm) process is in sub-millisecond range as shown in FIG. 3. The turn-on (TON) time for investigated VSH device with cell configuration of '1.5×4.5×5.8' is 0.4 ms and turn-off time ($\tau_{OFF}$) is 0.27 ms. During our investigation, we also observed that $\tau_{OFF}$ time is strongly affected by concentration of bimesogen and follow the trend of increase in $\tau_{OFF}$ time with increase in bimesogen concentration. The response time in VSH device is given by equation 1.

$$\tau = \frac{\gamma_1 P^2}{4\pi^2 K} \tag{1}$$

Where $\gamma_1$ is the rotational viscosity of the mixture, P is the helical pitch of CLC, and K is average of splay and bend elastic constant. It is interesting to note the modulation of effective phase retardation to variable tilt of helix in VSH device in two different polarities of applied electric field, as observed in FIG. 3[b] which demonstrates the linear dependence of flexoelectric free energy ($F_{flexo}$) generated on account of field-induced splay-bend deformations, as given by equation 2.[2,12]

$$F_{flexo} = -E \cdot [e_1 \cdot \hat{n}(\nabla \cdot_n) + e_3(\nabla \times n) \times \hat{n}] \tag{2}$$

Example 3

Figure 4:
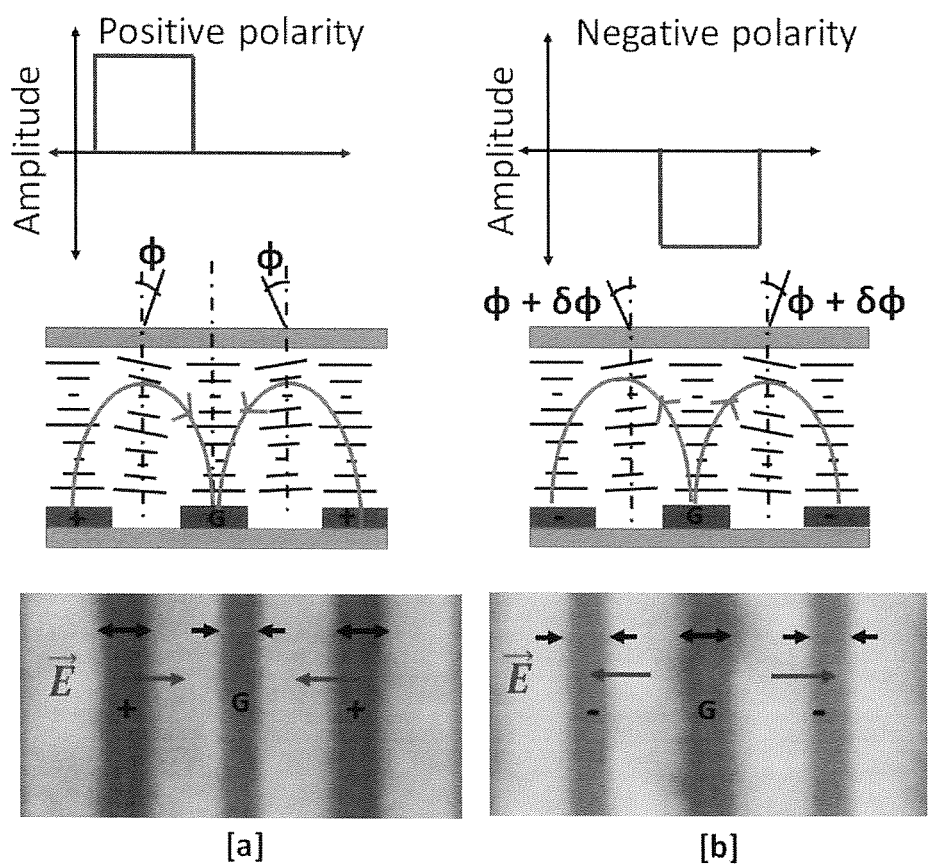
FIG. 4: The schematic representation of tilt of bimesogen-doped polymer stabilized liquid crystals in VSH mode in positive [a] and negative polarity [b] and corresponding polarized optical microscopy images. The red arrow in POM image shows the in-plane electric field direction and black arrows widening or narrowing of dark strips in POM images during electro-optic effect.

Polarized optical microscopic textures were observed during the polarity reversal with square wave AC electric field of 40 V/μm at extremely low frequency (0.1 Hz) for ease of observation. The interdigitated electrode pattern which shows alternate dark and bright strips on switching also demonstrated small movement of two neighboring bright strips closer to each other during one polarity while away from each other during the other polarity (FIG. 4). This phenomenon is an essential consequence of flipping of tilt in the helical axis with change in the polarity of applied electric field, as shown by the schematic in FIG. 4. The POM image shows the effect of varied birefringence in opposite polarities for negative polarity pulse which shows bright strips as compared to POM image for positive polarity. It is also worth noting that there is a widening of dark strip at the ground electrode (G) during negative polarity as the CLCs tilt away from the ground electrode. This effect reverses in positive polarity when the tilt is towards the ground electrode and there is narrowing of the dead zone at the ground electrode. To assist the visualization, the schematic illustration in FIG. 4 shows both forward and reverse tilt of CLCs with change in the polarity of electric pulse signal. In practical applications, the dead zones of the electric field can be eliminated by using specially-patterned electrodes.

Example 4

It should be appreciated that the various embodiments of the electro-optical device may also include one or more additional suitable layers or components that are arranged at any desired position relative to the various layers discussed. Thus, it should be appreciated that the electro-optical devices include one or more transparent conductive layers, including but not limited to: light transmissive enhancement layers, light reflective layers, light scattering layers, liquid crystal alignment layers, dielectric layers, polarizing layers, liquid crystal layers, electrochromic layers and electroluminescent layers, and combinations thereof. For the fringe-field switching (FFS) mode, a LC (liquid crystal) cell had interdigitated patterned pixel and counter electrodes separated with a thin layer of silicon oxide (50 to 200 nm) on one substrate and the other substrate having no electrode. The top electrode is photo-lithographically-patterned, including but not limited, an interdigitated pattern, where electrodes are separated with a periodicity of space (3 to 10 μm) and electrode width (2 to 10 μm). The electric field is applied between the pixel (upper layer) and counter electrodes (lower layer) on the same substrate to form a fringe field on the electrodes.

A representative FFS electro-optical cell comprises of two commercially available conductive glass substrates; one substrate has a multilayer stack structure of an underneath layer of a transparent conductive electrode layer, a silicon oxide ($SiO_x$) or other metal oxide insulation layer and a top transparent conductive electrode layer, and the other substrate has no electrode. A commercially-available glass substrate with ITO conductive layer thickness of 20 to 25 nm in thickness and a surface conductance around 70 to 120Ω/□ is used as the underneath electrode layer. A silicon oxide layer of 100 to 200 nm and second electrode 20 to 25 nm to give is consecutively sputter-coated on the underneath electrode with a RF and DC Magnetron In Line Sputtering System. The substrates are spin-coated with a thin layer of a polyimide alignment layer and rubbed in a uniaxial direction for homogeneous alignment, and the rubbing angle is 10 degrees with respect to the electrodes similar to those IPS cells. Cells are assembled with the substrates whose rubbing directions of alignment layers are in an anti-parallel fashion and separated with glass spacer beads to maintain a uniform gap of 3 or 6 microns.

Figure 5:
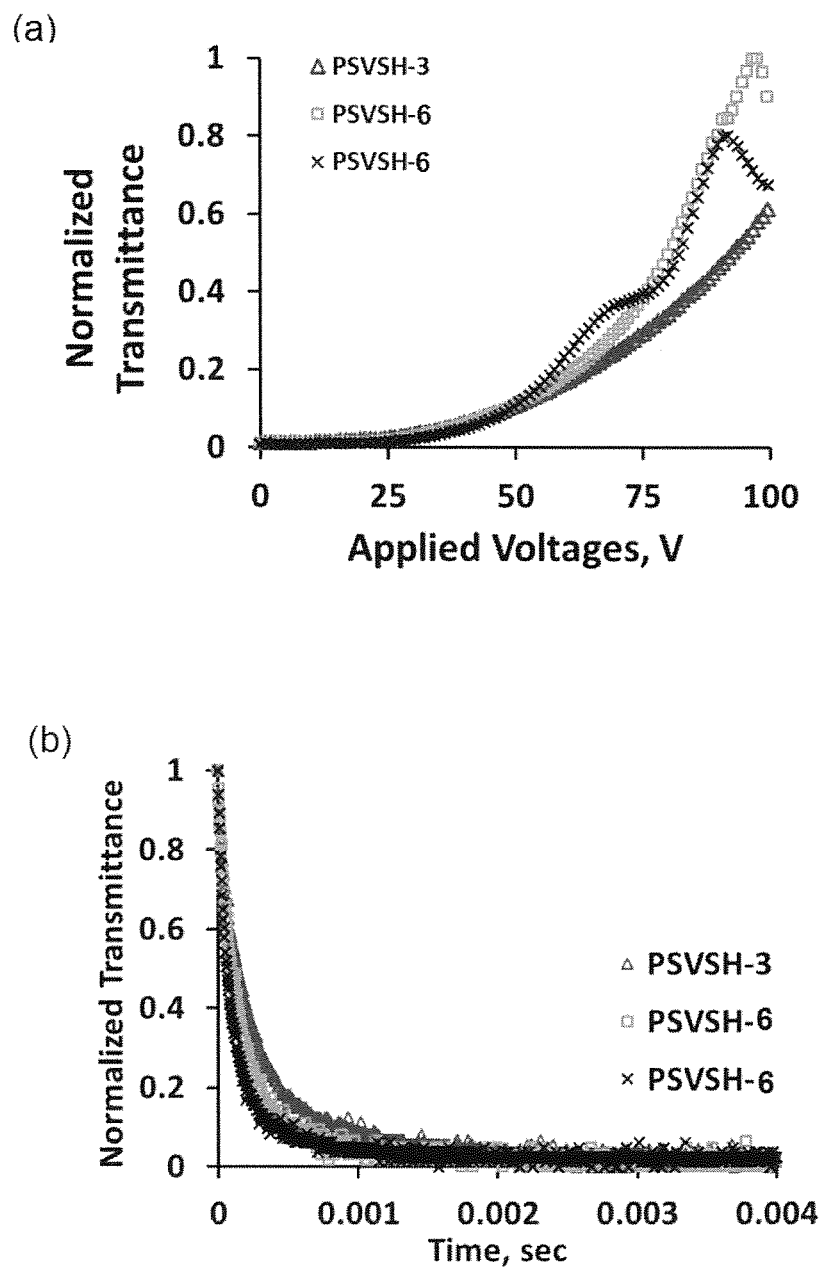
FIG. 5: (a) A voltage-dependent of transmittance plot and (b) a transmittance-time plot for PSVSH cells in FFS mode with 3- and 6-micron cell gap.
Figure 6:
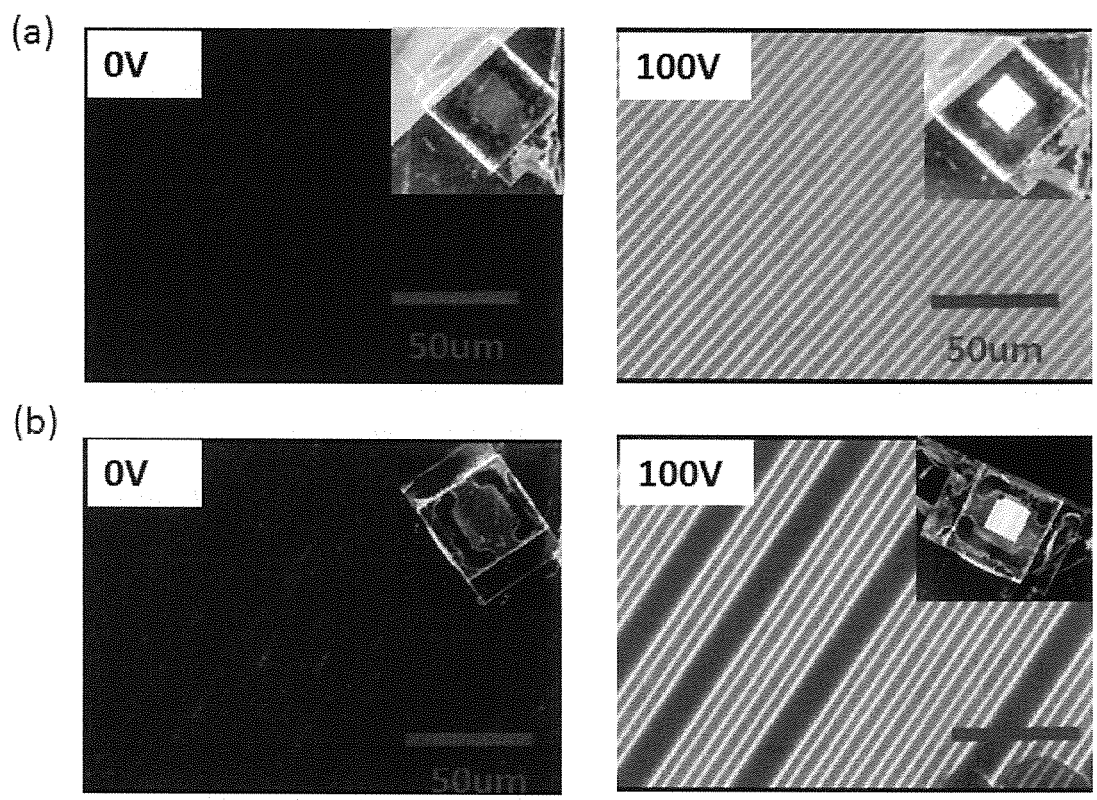
FIG. 6: The POM and cell images of PSVSH mode in FFS cells: [a] PSVSH cell with 4.4 microns, electrode spacing 5 microns and 3 microns cell gap, and [b] PSVSH cell with 4.4 microns electrode, 5 microns electrode spacing and 6 microns cell gap.

The electro-optical properties of PSVSH cells in FFS mode are evaluated with a method similar to those of IPS cells. FIG. 6 shows a voltage-dependent of transmittance plot (FIG. 5a) and a transmittance-time plot of field-off state (FIG. 5b) for three PSVSH cells with 3 microns (PSVSH-3) and 6 microns (PSVSH-6) cell gap. As shown in FIG. 5a, the normalized transmittance of a PSVSH cell with 6 microns cell gap has a higher effective fringe field and higher retardation than those of the PSVSH cell with 3 microns cell gap. The electro-optical performance can be further optimized in terms of the cell configuration.

FIG. 6 shows the POM and cell images of two FFS cells with electrode width of 4.4 microns, electrode spacing 5 microns and cell gap of 3 and 6 microns viewed with their alignment directions lay at 45 degrees between a pair of polarizers with their optical axes crossed at 90 degrees. The POM images of a PSVSH cell (FIG. 6a) with 3 microns cell gap has a good contrast between the dark state at 0V and a bright state with 100V. The inserts corresponding images of the cell at the off and on states also show good contrast. With the increase in cell gap, with 5 μm cell gap, the POM images of the PSVSH (FIG. 6b) shows a slightly decrease in optical contrast between the dark and bright states may be due to increase in number of pitches of cholesteric liquid crystal. The corresponding cell images manifest the quality of POM images as shown in the inserts. The optical contrast ratio PSVSH cells of the demon FFS cells are about 100:1, which can be further improved by optimizing the lithographic process to prevent broken electrodes.

While in accordance with the patent statutes, the best mode and preferred embodiment have been set forth, the scope of the invention is not limited thereto, but rather by the scope of the attached claims.

What is claimed is:

1. A bimesogen-doped and polymer-stabilized liquid crystal cell comprising:
   two glass substrates, each said substrate having an electrically conductive material thereon, and a liquid crystal composition contained therebetween;
   said liquid crystal composition comprising one or more calamitic nematic liquid crystals, one or more bimesogen nematic liquid crystals, one or more chiral dopants, one or more mesogens, and an ultraviolet light curing agent.

2. The bimesogen-doped and polymer-stabilized liquid crystal cell composition of claim 1, wherein the amount of said one or more calamitic nematic liquid crystals is from 30 to 90 parts by weight, wherein the amount of said one or more bimesogen nematic liquid crystals is from 10 to 70 parts by weight, wherein the amount of said one or more chiral dopants is from 0.1 to 10 parts by weight based upon 100 parts by weight of said one or more calamitic nematic liquid crystals and said one or more bimesogen nematic liquid crystals; wherein the amount of said one or more mesogens is from 1 to 30 parts by weight based upon 100 parts by weight of said one or more calamitic nematic liquid crystals and said one or more bimesogen nematic liquid crystals, and wherein the amount of said ultraviolet light curing agent is from 0.01 to 6 parts by weight based upon 100 parts by weight of said one or more calamitic nematic liquid crystals and said one or more bimesogen nematic liquid crystals.

3. The bimesogen-doped and polymer-stabilized liquid crystal composition of claim 2, wherein the amount of the one or more dopants is from 2.0 to 5.5 parts by weight, and wherein the amount of the one or more mesogen liquid crystals is from 3 to 15 parts by weight.

4. The bimesogen-doped and polymer-stabilized liquid crystal composition of claim 3, wherein the amount of the one or more dopants is from 3 to 5 parts by weight, and wherein the amount of the one or more mesogens is from 4 to 12 parts by weight.

5. The bimesogen-doped and polymer-stabilized liquid crystal composition of claim 2, wherein said one or more calamitic nematic liquid crystals comprises 4'-Pentyl-4-biphenylcarbonitrile, a mixture of several cyanobiphenyl compounds with long aliphatic tails, a high birefringence liquid crystal mixture, or a high dielectric liquid crystal mixture;

wherein said one or more bimesogen nematic liquid crystals comprises

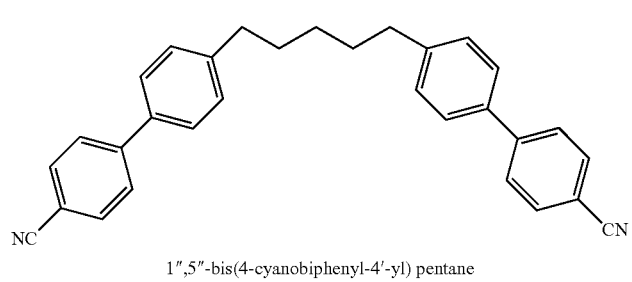

CB5CB

1″,5″-bis(4-cyanobiphenyl-4′-yl) pentane

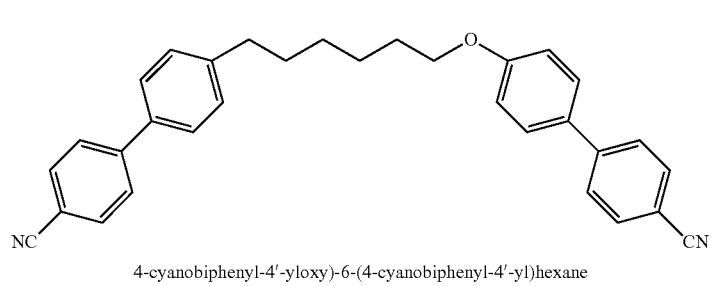

CB6OCB 4-cyanobiphenyl-4′-yloxy)-6-(4-cyanobiphenyl-4′-yl)hexane

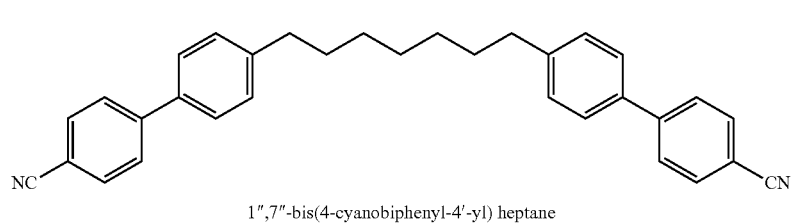

CB7CB

1″,7″-bis(4-cyanobiphenyl-4′-yl) heptane

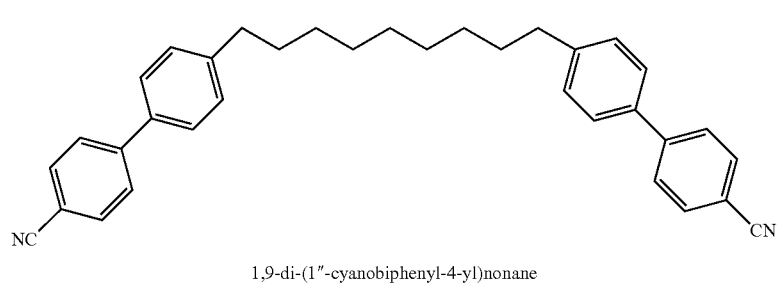

CB9CB 1,9-di-(1″-cyanobiphenyl-4-yl)nonane

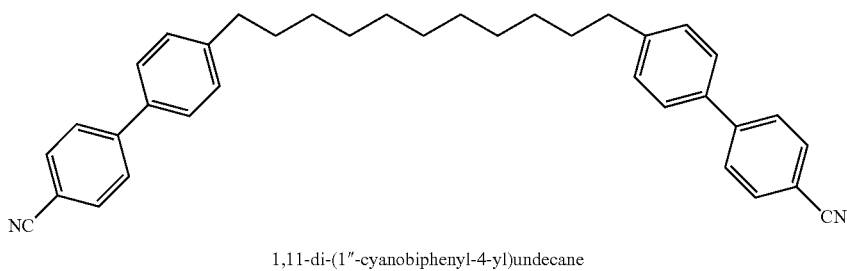
CB11CB
1,11-di-(1″-cyanobiphenyl-4-yl)undecane
wherein said one or more dopants comprises
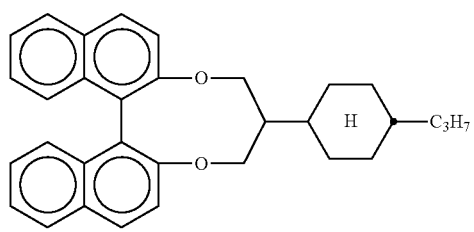
R5011
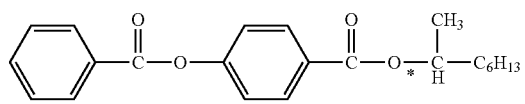
R811
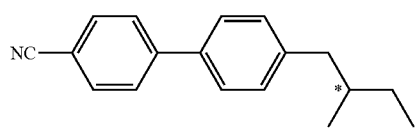
CB15
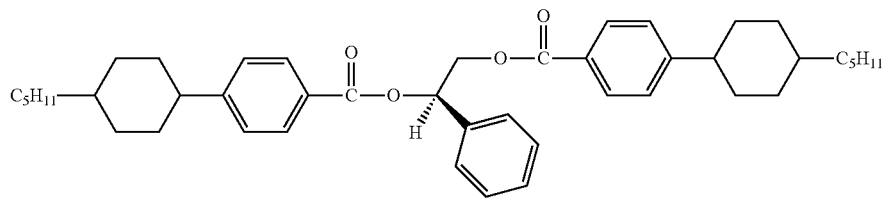
R1011
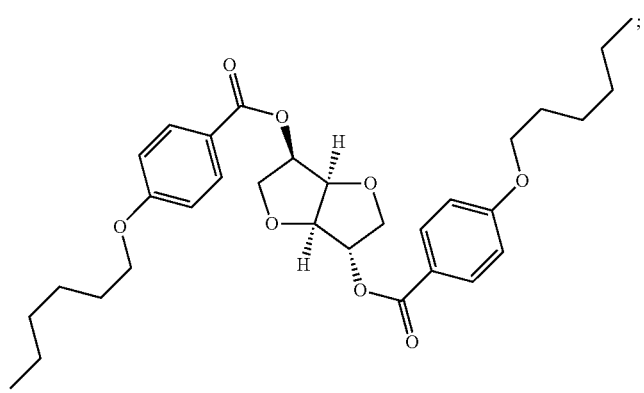
R2011
and
wherein one or more mesogens comprise:
RM 1

-continued

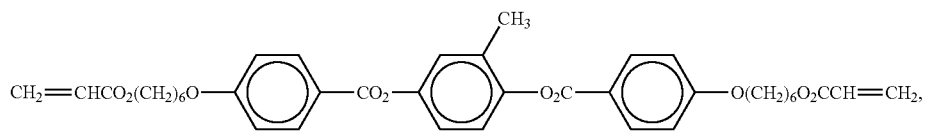
RM 82

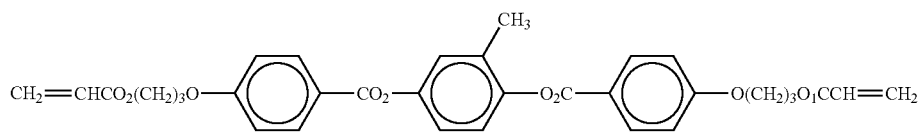
RM 257

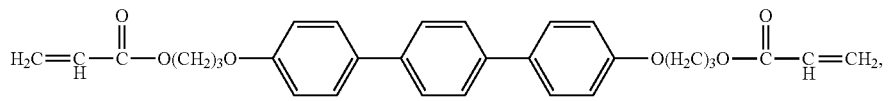
RM60

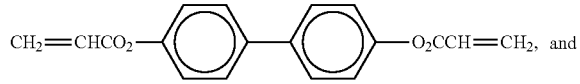
RM84

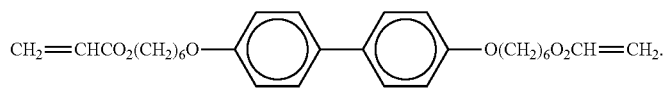
RM249

6. The bimesogen-doped and polymer-stabilized liquid crystal cell composition of claim 4, wherein said one or more calamitic nematic liquid crystals comprises 4'-Pentyl-4-biphenylcarbonitrile, a mixture of several cyanobiphenyl compounds with long aliphatic tails, a high birefringence liquid crystal mixture, or a high dielectric liquid crystal mixture;

wherein said one or more bimesogen nematic liquid crystals comprises

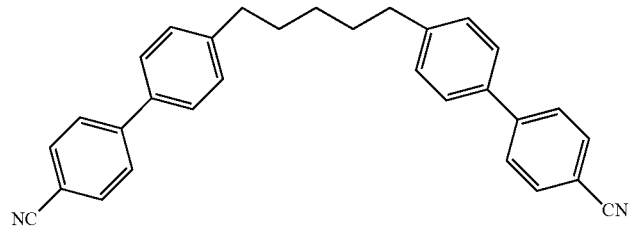
CB5CB
1″,5″-bis(4-cyanobiphenyl-4'-yl) pentane

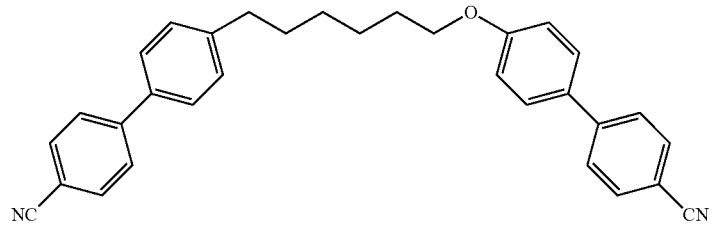
CB6OCB
4-cyanobiphenyl-4'-yloxy)-6-(4-cyanobiphenyl-4'-yl)hexane

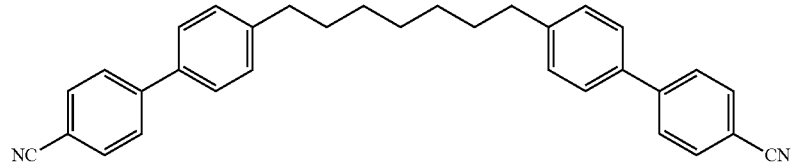
CB7CB
1″,7″-bis(4-cyanobiphenyl-4'-yl) heptane

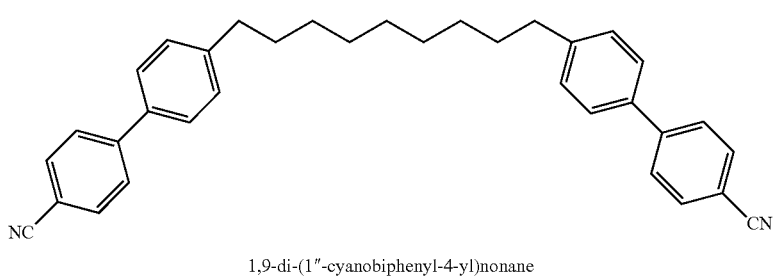
CB9CB
1,9-di-(1″-cyanobiphenyl-4-yl)nonane
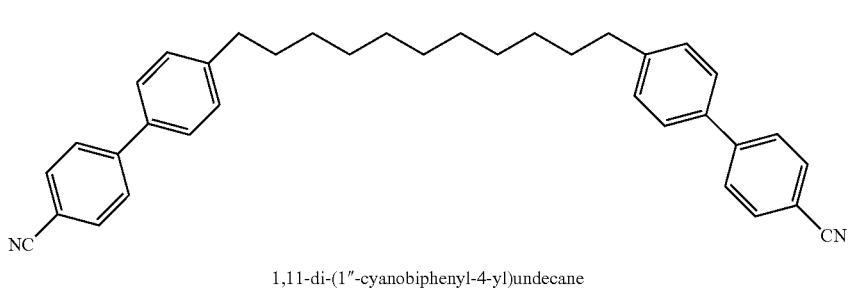
CB11CB
1,11-di-(1″-cyanobiphenyl-4-yl)undecane
wherein said one or more dopants comprises
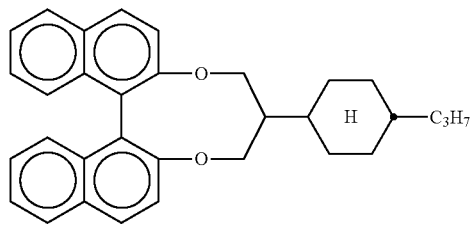
R5011
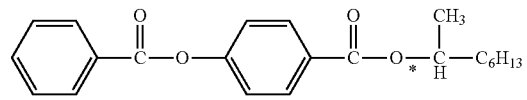
R811
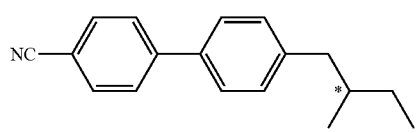
CB15
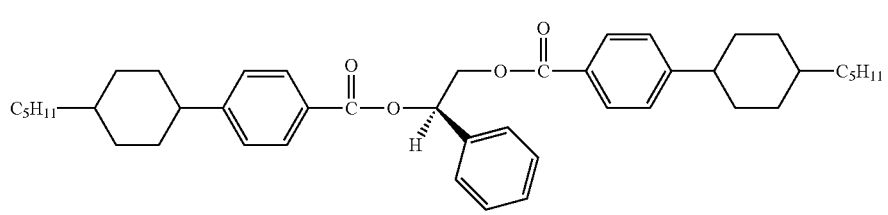
R1011

-continued

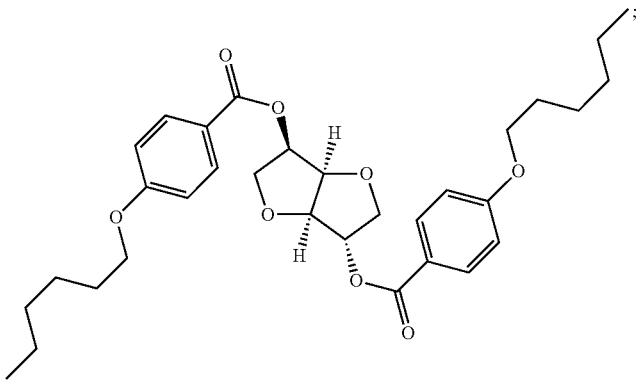
R2011 and
wherein one or more mesogens comprise:

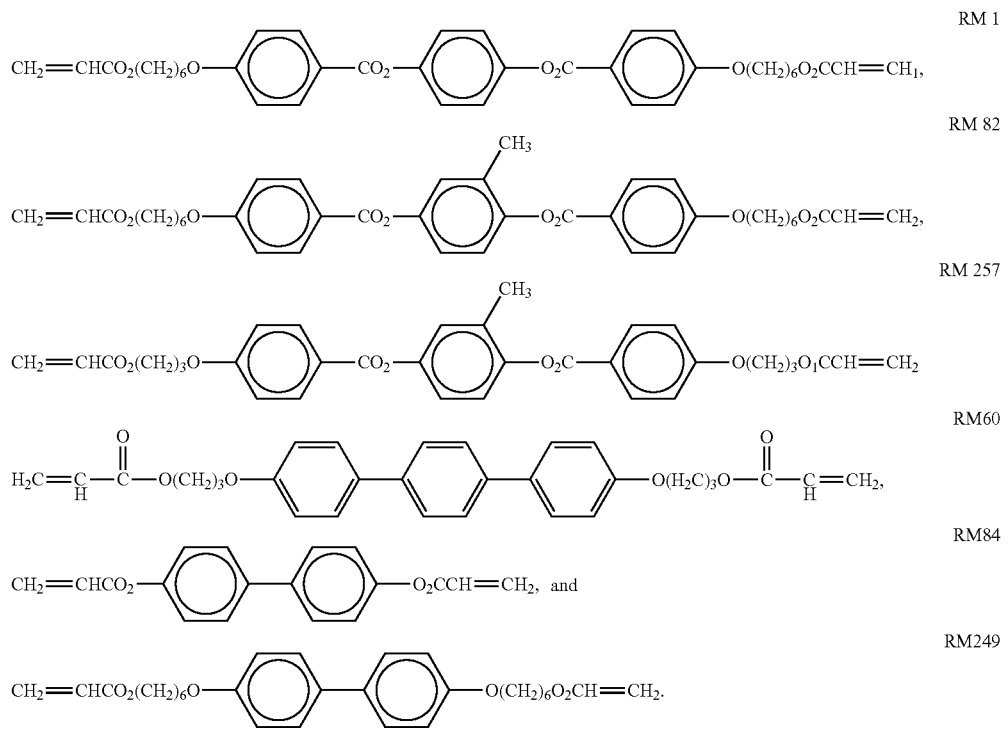

7. The bimesogen-doped and polymer-stabilized liquid crystal composition of claim 1, wherein said cholesteric liquid crystal has a helical pitch of from 100 to 300 nanometers.

8. The bimesogen-doped and polymer-stabilized liquid crystal composition of claim 2, wherein said cholesteric liquid crystal has a helical pitch of 100 to 300 nanometers.

9. The bimesogen-doped and polymer-stabilized liquid crystal composition of claim 5, wherein said cholesteric liquid crystal has a helical pitch of from 120 to 250 nanometers.

10. The bimesogen-doped and polymer-stabilized liquid crystal composition of claim 6, wherein said cholesteric liquid crystal has a helical pitch of from 120 to 250 nanometers.

11. The bimesogen-doped and polymer-stabilized liquid crystal composition of claim 1, wherein said liquid crystal composition is cured.

12. The bimesogen-doped and polymer-stabilized liquid crystal composition of claim 10, wherein said liquid crystal composition is cured.

13. A process for forming a bimesogen-doped and polymer-stabilized liquid crystal cell, comprising the steps of:
    mixing one or more calamitic nematic liquid crystals, one or more bimesogen nematic liquid crystals, one or more chiral dopants, one or more mesogens, and an ultraviolet light curing agent, and forming a liquid crystal composition; and
    placing said liquid crystal composition in a liquid crystal cell.

14. The process of claim 13, wherein the amount of said one or more calamitic nematic liquid crystals is from 30 to 90 parts by weight, wherein the amount of said one or more bimesogen nematic liquid crystals is from 10 to 70 parts by weight, wherein the amount of said one or more chiral dopants is from 0.1 to 10 parts by weight based upon 100 parts by weight of said one or more calamitic nematic liquid crystals and said one or more bimesogen nematic liquid crystals; wherein the amount of said one or more mesogens is from 1 to 30 parts by weight based upon 100 parts by weight of said one or more calamitic nematic liquid crystals and said one or more bimesogen nematic liquid crystals, and wherein the amount of said ultraviolet light curing agent is from 0.01 to 6 parts by weight based upon 100 parts by weight of said one or more calamitic nematic liquid crystals and said one or more bimesogen nematic liquid crystals.

15. The process of claim 14, wherein said one or more calamitic nematic liquid crystals comprises 4'-Pentyl-4-biphenylcarbonitrile, a mixture of several cyanobiphenyl compounds with long aliphatic tails, a high birefringence liquid crystal mixture, and a high dielectric liquid crystal mixture;

wherein said one or more bimesogen nematic liquid crystals comprises

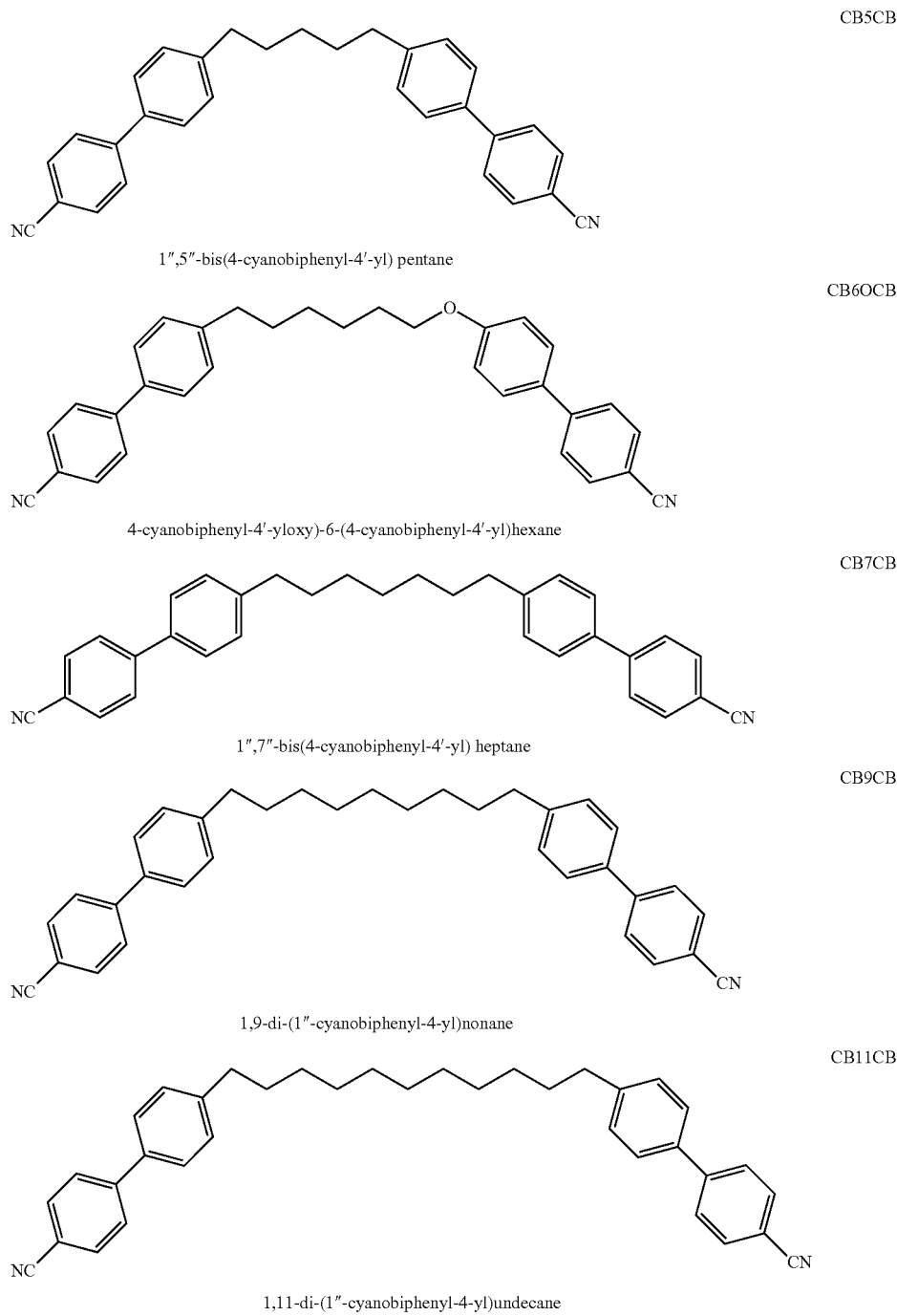

CB5CB

1",5"-bis(4-cyanobiphenyl-4'-yl) pentane

CB6OCB 4-cyanobiphenyl-4'-yloxy)-6-(4-cyanobiphenyl-4'-yl)hexane

CB7CB

1",7"-bis(4-cyanobiphenyl-4'-yl) heptane

CB9CB 1,9-di-(1"-cyanobiphenyl-4-yl)nonane

CB11CB 1,11-di-(1"-cyanobiphenyl-4-yl)undecane wherein said one or more dopants comprises
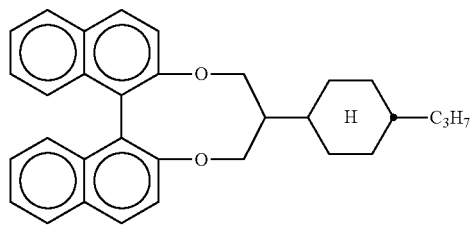
R5011
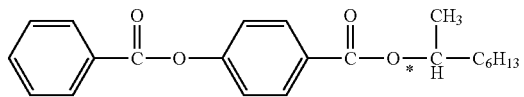
R811
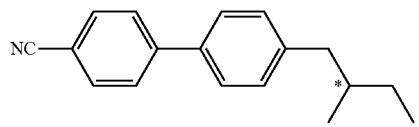
CB15
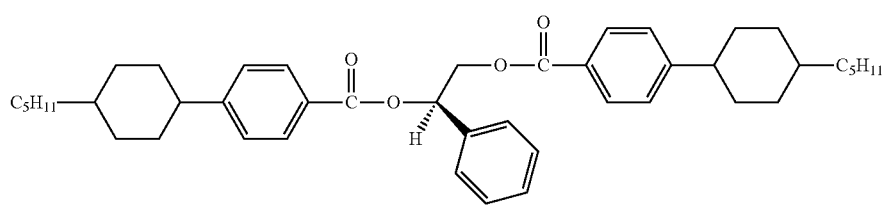
R1011
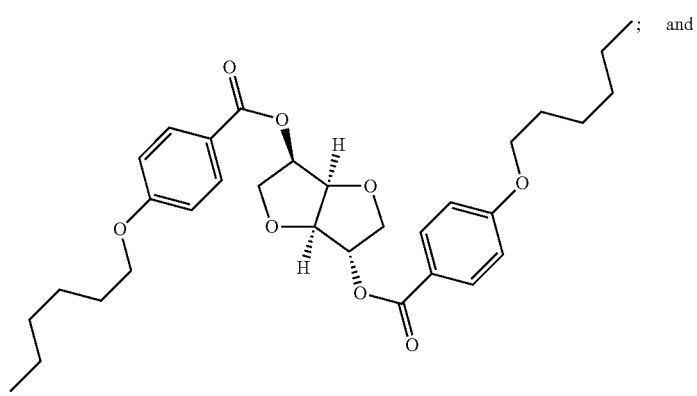
; and
R2011
and
wherein one or more mesogens comprise:
RM 1
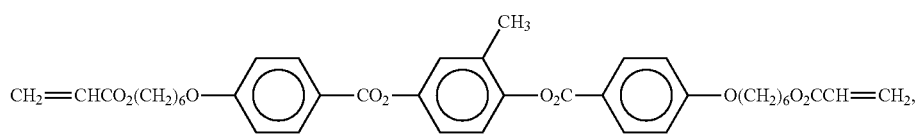
RM 82
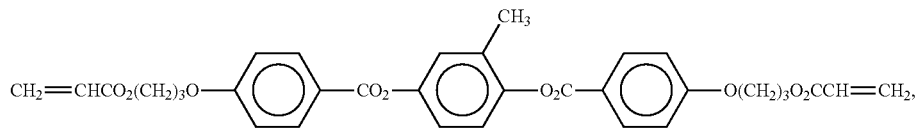
RM 257

-continued
RM60
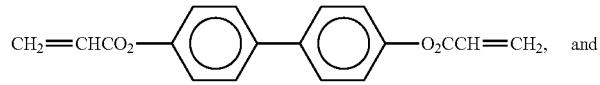
RM84
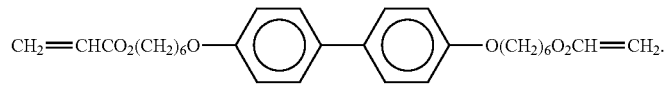
RM249
16. The process of claim 14, wherein said cholesteric liquid crystal has a helical pitch of from 100 to 300 nanometers.
17. The process of claim 13, including curing said liquid crystal composition.
18. The process of claim 15, including curing said liquid crystal composition.
19. The process of claim 17, including curing said liquid crystal composition.
* * * * *